Sept. 2, 1952     R. L. BOOTH     2,609,005
WARP BEAM COUPLING

Filed Jan. 5, 1950     2 SHEETS—SHEET 1

INVENTOR.
RAYMOND L. BOOTH
BY
Rodney C. Smithworth
ATTORNEY

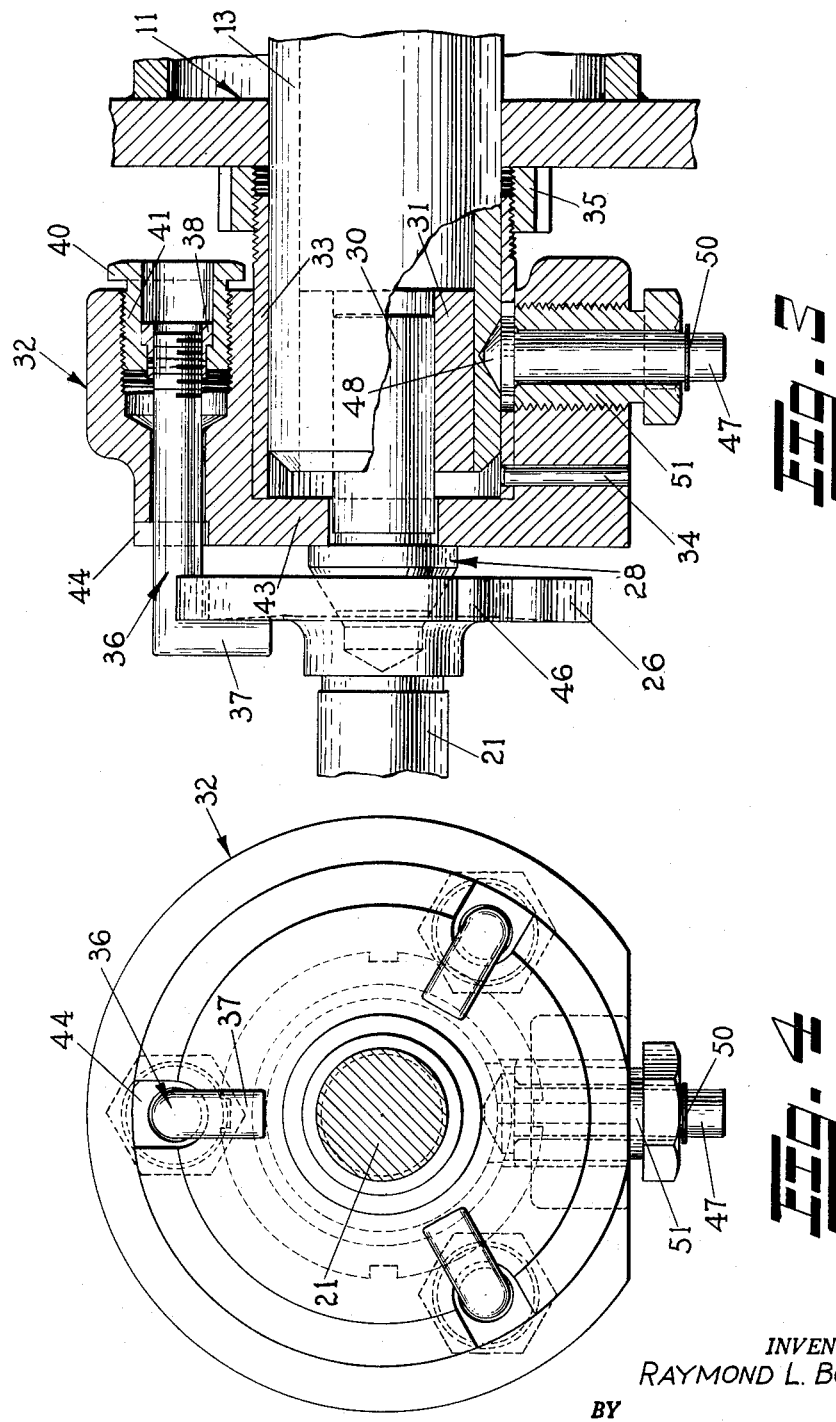

Patented Sept. 2, 1952

2,609,005

UNITED STATES PATENT OFFICE 2,609,005

WARP BEAM COUPLING

Raymond L. Booth, Milford, Mass., assignor to Draper Corporation, Hopedale, Mass., a corporation of Maine Application January 5, 1950, Serial No. 137,021

11 Claims. (Cl. 139—97)

This invention pertains to improvements in let-off means for warp beams or similar devices, and more particularly, to such means which has the multiple function of coupling the beam to a shaft or other mechanism for conveying torsional forces between the beam and its let-off means, and centering and supporting the beam in proper operational relationship to its accompanying let-off controlling parts.

It is a general object of the invention to devise an improved supporting and driving coupling for a warp beam or the like which is rotated by, or between which and certain combined driving and retarding mechanism, there is desired a coupling for conveying the torsional forces from one member to the other and for centering and supporting the beam within or at its proper axial position.

It is a more specific object of the invention to devise a supporting and torque conveying coupling which shall serve to perform the above mentioned functions and which shall be of such compact nature as to occupy a very limited space in accordance with practical requirements of mechanisms to which attachments for effecting the proper let-off of the warp beam are applied.

It is a further object of the invention to devise a coupling of the type described which may easily be adapted to existing warp beams and which shall serve for rapidly interconnecting and disconnecting such beams from their driving or supporting devices, the said functions of connecting and disconnecting the beam during mounting or withdrawing thereof requiring a relatively short period of time and no particular skill beyond that normally possessed by persons operating such machinery.

Other objects of the invention will become apparent from the following more detailed disclosure.

In fabric-forming machines such as warp knitting machines, looms, and the like, certain of the threads which eventually become a part of the fabric are wound upon warp beams, the latter frequently being mounted in multiple upon a common axis and adapted to be rotationally controlled by interconnecting the same to driving means or to retarding means, or more preferably, to a device adapted to drive and/or to retard the beam in accordance with the tension in the warp threads or warp sheet drawn therefrom thereby to maintain a definite and predetermined tension on those threads. According to modern practice, threads are drawn from the warp beams by the fabric-forming instrumentalities and are maintained under a suitable tension adjacent those instrumentalities by some tensioning means, many of which are known to those skilled in these arts. The warp beams with the warp threads wound thereon comprise a considerable mass and thus there is a great deal of inertia to be overcome in starting and stopping the beams, that being a function which should be done smoothly but more or less instantaneously whenever the machine with which the beams function is started or stopped. Of course, the tensioning means is adapted to iron out or compensate for variations in the warp tension within certain limits, but the beams are preferably started under power and are prevented from overrunning by brake or retarding means, one form of the same being evident in electrically controlled means responsive to changes in position of the warp thread tension devices and which is adapted to apply the requisite power or torque to the warp beam when tension tends to become excessive or exceed a predetermined value, or alternately, to retard the forward rotation of the beam or beams to prevent undue slackness in the warp threads. The function of such warp driving and retarding means is understood by those conversant with the practices in the industry and further disclosure of the mechanism or the manner in which it functions need not be given here.

According to the invention hereinafter described in greater detail, the warp beam or beams (it being unedrstood at this point that in some machines a very large single beam is employed, while in other machines a plurality of warp beams are mounted on a single core or axis) are controlled by a unit geared to a supporting shaft coaxial with the beam axis itself. At the start these beams must be hoisted into position to be journalled in the knitting or other fabric-forming machine and after hoisting into position, must be centered and connected to the let-off governing means individual to the particular fabric-forming device in which the beam is to function. While these beams are coupled to the let-off or driving means which may include a shaft or other similar mechanism at one end, at the other end they are freely journalled for rotation within a bearing of any convenient type.

Since a vast number of machines to which the more modern and superior driving or let-off control mechanisms are adapted and upon which they may be mounted without any radical change are outstanding, it is desirable to convert these machines, especially when the same have been otherwise modified to increase their speed, or to produce fabrics formed from some of the newer and more difficult yarns to handle. When these machines are thus converted, it is frequently found that the bearing means in which the warp beams have heretofore been supported either do not serve adequately or may not be used at all. For that purpose coupling means such as is described hereinafter has been developed and is found to serve very satisfactorily. It also makes possible the conversion of these older machines with a minimum of expense and while assuring a maximum of efficiency and complete realization of the advantages attendant upon the use of the more modern let-off devices.

Briefly, the coupling means serves to support the beam at one or more of its ends and also to maintain it in perfectly centered alignment with the bearing and rotating elements which serve to support and to drive or otherwise control the rotation of the beam. A flange or the equivalent is formed at the end of a shaft driven or otherwise rotationally controlled as hereinafter described and that flange functions in cooperation with a slidable collar mounted at the end of the warp beam core or shaft and having adjustably fixed at spaced points thereabout, a plurality of hook or clamping members which serve to draw the collar toward the flange. The flange is apertured centrally for the reception of a centering and supporting pin which is slidably mounted in the end of the warp beam core, and since the said collar is shouldered or otherwise formed so that in cooperation with corresponding surfaces on the centering pin, the clamping action between the collar and flange serves to force the centering means into the aperture in the flange thereby completing a combined supporting and centering interconnecting means between the flange and the beam. The core is additionally keyed or otherwise locked for rotation with the beam and since the clamping means are positively prevented from slipping about the periphery of the flange, the rotational forces of one of the elements are conveyed through to the other so that the beam is centered, supported for rotation, and also caused to rotate with the flange and incidentally the driving shaft or other intermediate connecting means between the let-off controlling unit and the beam.

One specific form which the invention may take has been illustrated and will be described in greater detail in the following more specific disclosure in which like parts are referred to by identical reference characters applied to similar parts throughout the figures of drawing in which:

Fig. 3 is a view corresponding to Fig. 2, but showing the parts in assembled relationship.

Fig. 4 is an end view of Fig. 3.

Figure 1:
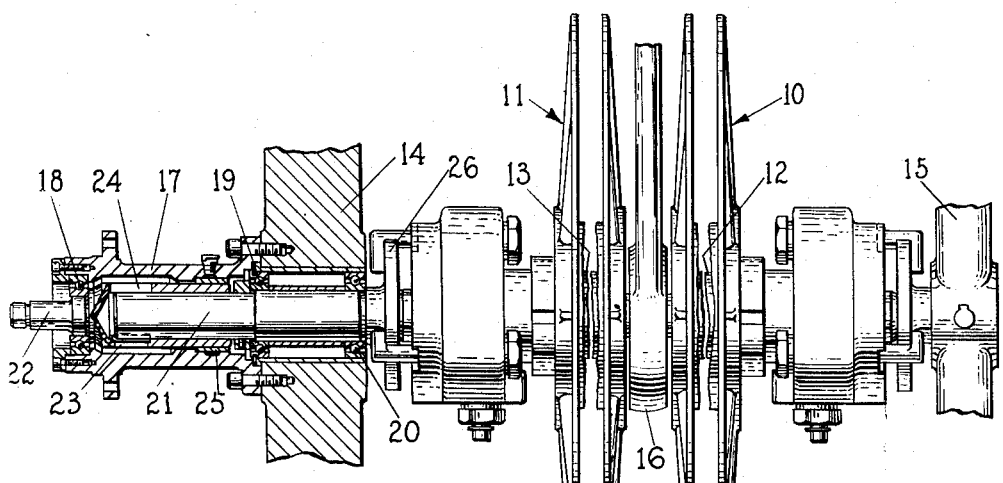
Fig. 1 is a partial section showing warp beams mounted on a common axis and adapted to be controlled by a let-off unit and to which the coupling in accordance with the invention herein described has been applied.

Now referring to Fig. 1, two warp beams mounted upon the same central axis are generally illustrated by numerals 10 and 11 and comprise the flanges and yarn supporting barrels which are mounted upon central cores 12 and 13, the latter preferably being in the form of large tubes upon which the flanges are mounted. The barrel portions serve as a base for the thread which is wound thereupon and confined between the flanges thereafter to be drawn therefrom as the fabric forming instrumentalities function and as the beam is slowly rotated to let off the requisite amount of warp thread required by the instrumentalities. According to the present illustration, the warp beams which are of any convenient length but are shown broken and thus very much contracted are carried in frame members such as the end frames or end frame extensions 14 and 15 and a central bearing 16, the latter preferably being split, although it may be constructed in accordance with any of the conventional practices understood by those skilled in the art, but which need not be illustrated or mentioned further here.

The journal or bearing means incidental to the central supporting member 16 may be of antifriction type or of any other construction desired, but is preferably of such form as to permit interconnecting means between the cores 13 and 12 so that, once assembled, the two beams 10 and 11 rotate as a unit. The frame member 14 has bolted thereto an extension 17 which carries in bearings 18, 19 and 20 a central rotating shaft 21 and short extension 22, these being interconnected so that there is a definite amount of axial movement possible, that being employed mainly for the purpose of assembly, but restrained against relative rotation by one or more keys 23 fitting within suitable slots or keyways in the shaft 21 and within an enlarged sleeve portion 24 of the shaft extension 22, the latter being machined to carry a gear or other similar machine element through which the torque imparted to or by shaft 21 is conveyed through to the let-off controlling unit, it being generally preferable that considerable reduction in speed ratio be provided so that the unit may rotate at a relatively rapid rate as compared to the rotation of the beams, the latter as is well known, being rotated relatively slowly especially when they are nearly full of yarn. The inner end of sleeve 24 is borne in a bushing 25.

Figure 2:
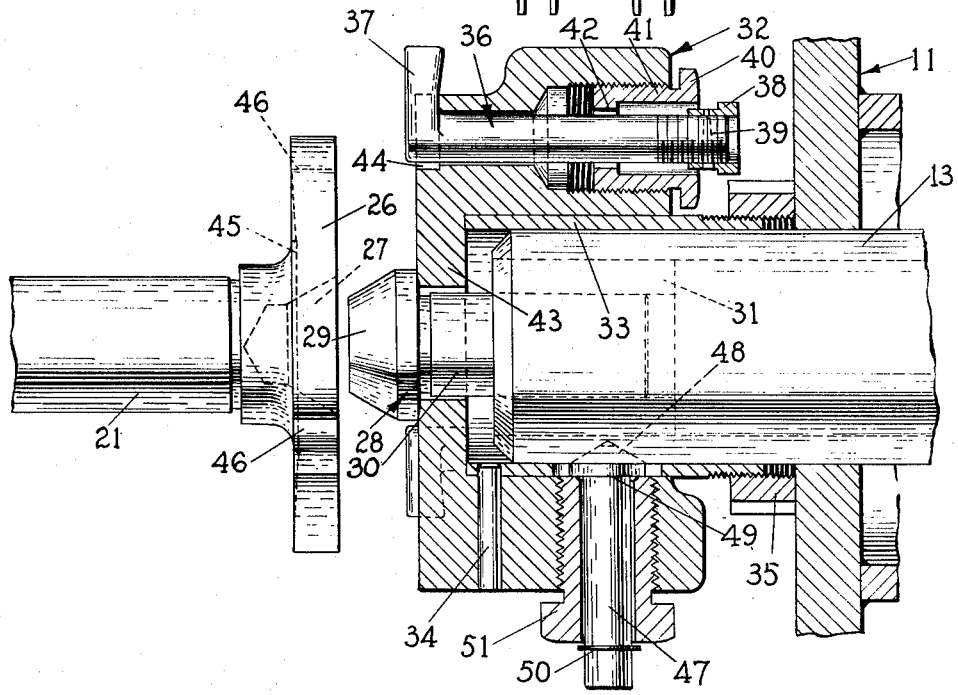
Fig. 2 is a sectional view showing the coupling disconnected from the flange and illustrating the parts to a larger scale than that employed in Fig. 1.

The shaft 21 has at its inner end an enlarged portion or flange 26, shown more clearly in Fig. 2, it being understood that this flange may be machined as an integral part of the shaft 21 or that it may be suitably attached thereto if that is found more practical. This flange is apertured at 27 and the aperture is preferably tapered as illustrated for the reception of a centering means in the form of a pin or pilot 28 which has a tapered portion 29 adapted to fit precisely in the tapered aperture 27. This pilot 28 is turned down to a smaller diameter so that its inner extension 30 is adapted to have a working or sliding fit in a sleeve 31 pressed tightly into or shrunk into the interior bore of the core 13 and adjacent the end thereof. The bearing means for and particular construction of the rotating shaft 21, and its sleeved extension 22, etc., are not especially important since the same do not comprise a part of the coupling itself and are important only in that they carry the flange 26.

A collar generally indicated by numeral 32 is mounted upon a sleeve 33 which is in turn slidable upon the exterior diameter of the beam core 13 except as it is locked in place as hereinafter described. While the collar is slidably mounted on the sleeve 33, it is prevented from moving either endwise or from rotating with respect thereto by one or more pins 34 which pass through both the collar and the sleeve. This sleeve 33 is exteriorly threaded and carries a nut 35 which abuts against the outer end of the adjacent flange of the beam and serves when the parts are assembled to lock the flanges or beam sections in position upon core 13, or to permit adjustment between these sections.

The collar is also bored out for the reception of hooked bolts 36 which have the angularly disposed or hooked ends 37 and extend inwardly or toward the beam flange to carry fixed thereto at their inner ends the stop collars 38 each of which is threaded onto its bolt and also pinned as illustrated by the taper pin 39 or otherwise prevented from relative rotation on the bolt once they have been assembled to their proper position.

Each of the bolts extends through a special sleeve type nut having a head 40, an elongated sleeve portion exteriorly threaded and indicated by numeral 41, and an inner shouldered part 42 which cooperates with the stop collar 38 as illustrated in Figs. 2 and 3.

The sleeve type nuts are threaded into enlarged openings or recesses in the collar 32 which align with the drilled holes through which the bolts 36 are passed and by which they are guided, and when the nuts are rotated in such direction that they move outwardly of their threaded apertures, as shown in Fig. 3, they draw the hooked bolts inwardly or from left to right to clamp or draw the collar into closer engagement with the flange 26. That then forces the tapered end 29 of the centering or pilot pin 28 into the aperture 27 since the collar is shouldered as at 43 and bears against a cooperating abutment or shouldered portion on the pin. The hooked ends 37 of each of the bolts, it being understood that any convenient number of these hooked bolts may be employed, but that three as illustrated here have been found to serve quite satisfactorily, may be pushed inwardly as illustrated in Fig. 2 to facilitate withdrawal or assembly of a beam. When they are to be so pushed inwardly and the beam assembled or withdrawn, the sleeve type nuts are rotated in such direction as to loosen the hooked bolts so that they may be swung from the position of Fig. 3 into that of Fig. 2 wherein they are retained in recesses 44 by means of which they are prevented from falling downwardly or to a position in which they would interfere with assembly of the parts. They may also be retracted to a greater extent due to the said recesses. The stop collars 38 serve in conjunction with the interiorly disposed shouldered portions 42 of the sleeve type nuts to draw the bolts in one direction (left to right here), but do not interfere with swinging the bolts or pushing them to the position of Fig. 2 once the nuts have been loosened thereby to make that possible. Preferably the flange 26 is undercut as shown at 45, although that is not entirely necessary, and the hooked ends 37 of the bolts are similarly inclined inwardly.

The flange 26 is notched as at 46 for the reception of the bolts 36, it being understood that as the parts are assembled they move together axially from the position of Fig. 2 to that of Fig. 3 after which the bolts may be moved to the left and then swung downwardly to the position of Fig. 3, after which they may be drawn up by application of a suitable wrench or other tool to the head 40 thereof. The bolts and the notches 46 must, of course, first be brought into alignment.

To complete the drive or to interconnect the beam to the shaft 21 so that each rotates with the other, a suitable key or other rotation restraining element may be employed, but it has been found that that herein shown serves quite satisfactorily and provides for easy attachment or detachment of the collar and sleeve from the end of the core 13 if that should be desired. A pin 47 preferably although not necessarily tapered at its inner end as at 48 is also shouldered at 49 and is held by a snap ring 50, or by other satisfactory means within a threaded adjusting sleeve 51. The sleeve 33 is cut away to admit the point 48 into a cooperating indentation in the core 13. When set up tightly the collar 32 is locked against movement on the core.

The pin 47 may be threaded directly within the collar in which event the pointed end need not be shouldered and the outer or exposed end will be provided with a slot or otherwise formed so as to be turned by a suitable tool to engage the point with a corresponding indentation in the core 13. If desired, a plurality of these locking means may be used so as to fix the position of the collar 32 on the end of a warp beam more firmly.

A warp beam is prepared by winding thereon the mass of warp yarn in a manner well known to those skilled in the textile art whereupon that beam is inserted in the knitting machine or other textile machine by hoisting it on some type of conveyor or sling so that it may be entered into the bearing or bearings provided therefor and so that the coupling may be engaged as presently described. The preparation of the beam also includes mounting the various beam sections on the core 13 or the like, then assembling the collar mechanism thereon and tightening the key or locking means 47 and the nut 35. The nut 35 is set up by a suitable wrench thereby clamping the beam sections against each other and against a common abutment at the opposite end of the core. It is to be understood that at any time, loosening of the nut 35 permits the beam sections to be adjusted angularly relative to one another, that sometimes being necessary if the warp at the center or at some other point along the beam tends to become too slack or for some other reason, the warp tension is not uniform throughout the entire beam length.

The center bearing 16 is preferably of split type as before explained and may or may not include an antifriction bearing but, if an antifriction bearing is used, then it is first put on the beam end which is to be carried within the bearing 16 and the beam may be swung into place so that that bearing engages in its support or pedestal whereupon the cap is bolted in place after which the opposite end of the beam is swung to the position shown in Fig. 2 where the end of the pilot pin is aligned with the tapered opening 27, it being understood that the hooked bolts are retracted as shown in Fig. 2. The flange 26 is rotated so that the notches 46 align with the bolts 36 whereupon the entire beam assembly may be moved endwise so that the pilot pin 28 engages within the aperture 27. The bolts 36 are then pushed outwardly and their hooked ends are swung throughout about 180° to engage at the opposite side of the flange 25.

Movement of the beam assembly endwise is possible since the opposite end of the core 13 may be capable of a limited amount of sliding movement in the bearing 16 or antifriction bearing contained within that bearing if such is utilized. After the hooks 37 have been engaged behind the flange 25 the nuts 40 are turned outwardly of their recesses, that is, are rotated so as to move to the right, Figs. 2 and 3, and thereby tighten the bolts 36 to clamp the collar, pin 28 and the flange 25 into a functionally unitary assembly which serves to support and to connect the beam for rotation with shaft 21. The torque forces applied to the beam by drawing the warp threads therefrom are conveyed through to the let-off control means through shaft 21, or the torque forces applied to shaft 21 likewise are conveyed through to the beam depending upon whether or not the beam is actually being positively advanced at any particular time or is being braked or retarded by the let-off means as occurs most of the time.

The preferred embodiment of the invention is that herein shown and described in which the collar is a part of the beam and the flange is carried by the shaft 21, however, it is to be understood that the parts may be reversed so that the flange defines the end of the core 13 of the beam and the other part of the mechanism forms a continuation or is assembled to and functions by rotating as a part of shaft 21.

It has been explained that the beam cores 13 and 12 are interconnected at the centering bearing by any convenient mechanism such as splines, dogs, a screw-driver type joint or various other expedients to be found in this or related arts. If desired, a corresponding coupling connection may be used at the opposite bearing 15 as illustrated in Fig. 1, the parts being constructed and functioning substantially as above described, although, of course, the torque conveyed is not great and the actual function of the coupling at that end of the beam assembly is one of centering and supporting and facilitating introduction and withdrawal of the beam rather than that of conveying torque forces as at the opposite or primary side. At that side the flange corresponding to flange 26 is a part of or attached to a short stub shaft which projects into the bearing 15 in which it is rotatable either in a bushing or antifriction bearing, any satisfactory bearing means being adequate for the purpose at this point.

The hooked bolts 36 are preferably engaged within the notches 46 which accommodate about one-half the cross-sectional area of the bolt itself. In some instances it may be desired to employ other dogs or engaging devices which tie the coupling parts together for rotation and then the hooked bolts may serve only to clamp the parts together. Such change is obvious to those skilled in the art.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. The combination with a yarn beam and a let-off means therefor, of a supporting and torque transmitting coupling which comprises a flange on one member, a collar on the other member, a tapered centering means carred by the collar and engageable within a correspondingly tapered aperture in the flange, means for clamping the collar and flange together and means for restraining relative rotation between the flange and collar and between the collar and beam.

2. The combination with a yarn beam and a let-off means therefor, of a beam supporting and torque transmitting coupling which comprises an axially movable centering means individual to one of the members, a functionally integral flange at the other member, an aperture in said flange into and from which said centering means may be moved, and means for forcibly retaining the centering means in the said aperture comprising a collar sildable on said one of the members and clamping means between the collar and the flange, and means carried by the collar and movable to and from a complementary abutment forming a part of the said one member for restraining relative rotation between the two.

3. The combination with a yarn beam and a let-off means therefor, of a supporting and torque transmitting coupling which comprises a centering means slidable in one of said members, a flanged means forming a part of the other of said members within which said slidable centering means engages, a clamping collar and means for drawing said collar toward said flanged means, said collar having means interengaging said centering means for maintaining its axial position toward the flanged means and other means forming an operative part of the collar for restraining relative rotation between the collar and said one member.

4. The combination with a yarn beam and a let-off means therefor, of a supporting and torque transmitting coupling which comprises an axially movable centering means carried by one of the members, a flange at the adjacent end of the other member, a central aperture in said flange into and from which said centering means may be moved, and means for forcing said centering means into the aperture in said flange and for trnasmitting the rotational movement of the let-off means to the beam which comprises a collar slidable along and concentrically disposed upon that member opposite the flange, clamping means axially movable in the collar and engaging behind the flange and in notches therein, and complementary shoulder means on both the collar and centering means for preventing relative movement therebetween in one direction, and key means between the collar and that member upon which it slides for transmitting the torque.

5. The combination with a yarn beam and a let-off means therefor, of a supporting and torque transmitting coupling which comprises an axially movable centering means carried by said beam, a functionally integral flange on the said let-off means, an aperture in said flange to and from which said centering means may be moved, and means for retaining said centering means within the aperture in the flange and for transmitting rotational movement of one of the members through to the other which comprises a collar slidable along the axis of the beam and centrally disposed thereon and positioned at that end of the beam adjacent the end of the flange, clamping means forming a part of the collar and engageable with the flange and means for drawing said clamping means axially of the collar and for locking the said clamping means thereby to retain the centering means tightly within the aperture in the flange and to interconnect the said collar and flange for restraining relative rotational movement between the two, and means between the collar and beam for preventing rotational movement therebetween.

6. The combination with a yarn beam and a let-off means therefor, of a supporting and torque transmitting coupling which comprises an axially movable centering means carried by said beam, a flange forming an integral portion of the said driving means, a central aperture in said flange into and from which said centering means may be moved, and means for forcing said centering means into the aperture in said flange and for transmitting rotational movement between the said driving means and beam which comprises a collar slidable along and concentrically disposed upon the axis of said beam and positioned adjacent the flange, clamping means forming a part of said collar and axially movable therein, said clamping means being adapted to engage over the periphery of the flange and to draw the flange toward the collar, complementary shoulders on the centering means and within the collar for determining their axial relationship, and key means between the collar and the beam for restraining relative rotation therebetween.

7. The combination with a yarn beam and a let-off means therefor, of a supporting and torque transmitting coupling which comprises an axially movable centering means carried by the beam, a flange forming an integral part of the let-off means and adjacent the beam, a central aperture in said flange into and from which said centering means may be moved, and means for forcing said centering means into the aperture in said flange and for transmitting the rotational movements of one of the members through to the other which comprises a collar slidable along and concentrically disposed upon the axis of the beam, clamping means axially movable within the collar and adapted to engage behind the flange and within notches therein, said clamping means comprising a plurality of hooked bolts and complementary threaded members for drawing said hooked bolts axially of the collar, complementary shoulders on the centering means and within the collar for preventing relative movement therebetween in one direction and for forcing the centering means toward and into the aperture in the flange, and key means between the collar and the beam for restraining relative rotation therebetween.

8. The combination with a yarn beam and a let-off means therefor, of a supporting and torque transmitting coupling which comprises an axially movable centering pin carried by the beam, a flange integrally formed as a part of the let-off means, a central tapered aperture in said flange into and from which said centering means may be moved, said centering means having a correspondingly tapered end for engagement within said aperture, and means for forcing said centering pin into the tapered aperture in said flange and for transmitting the rotational movements of one of the members through to the other which comprises a collar slidable along and concentrically disposed upon the axis of the beam, clamping means comprising a plurality of hooked bolts passing through said collar and axially disposed with respect to the collar and beam, said bolts having their hooked ends adapted to engage behind the flange, and complementary threaded sleeve type nuts seated in recesses in the collar for drawing said hooked bolts axially of the collar and thereby clamping the collar to the flange and forcing the centering pin into tight engagement with the aperture in the flange, and means for locking said collar and the beam against relative rotation.

9. For use with a yarn beam and a let-off means for governing the rotational movements of said beam, a supporting and torque transmitting coupling which comprises a flange on one member, a collar on the other member, a tapered centering means carried by the collar and engageable within a correspondingly tapered aperture in the flange, means for clamping the collar and flange together and means for restraining relative rotation between the flange and collar and between the collar and beam.

10. For use with a yarn beam and a let-off means for governing the rotational movements of said beam, a supporting and torque transmitting coupling which comprises a centering means slidable in one of said members, a flanged means forming a part of the other of said members and having an aperture therein within which said slidable means engages to center and support the beam, a collar and means for drawing said collar toward said flanged means comprising hooked bolts and threaded members for drawing said hooked bolts into clamping engagement with the flanged means, and other means for locking said collar to that member upon which it is mounted for preventing relative rotation between it and the member.

11. For use with a yarn beam and a let-off means for governing the rotational movements of said beam, a supporting and torque transmitting coupling which comprises a centering pin movable in the beam and having a tapered end portion, a flange forming an integral part of the let-off means and having therein a complementary tapered opening within which the said centering means is adapted to be engaged for centering and supporting the beam, a collar concentrically disposed and carried by an extension of the end of the beam and having abutment means for engaging said centering means and maintaining its axial position toward its flange means, a plurality of hooked bolts for engaging behind the flange and apertures in said collar through which said bolts extend in parallelism to the axis of the beam, threaded means for drawing up said bolts thereby to clamp the collar, centering means and flange in assembled relationship and means whereby said bolts may, upon loosening said means for drawing the bolts into tight relationship, be swung away from the collar and pushed inwardly within the collar to facilitate connection and disconnection of the beam with the flanged supporting and torque transmitting portion of the cooperating let-off means, and locking means for restraining relative rotation between the collar and beam.

RAYMOND L. BOOTH.

REFERENCES CITED

The following references are of record in the file of this patent:

UNITED STATES PATENTS

| Number | Name | Date |
| --- | --- | --- |
| 1,797,955 | Hall | Mar. 24, 1931 |
| 2,424,400 | Kronoff | July 22, 1947 |
| 2,514,152 | Darash | July 4, 1950 |